United States Patent
Recoura et al.

(10) Patent No.: US 9,512,859 B2
(45) Date of Patent: Dec. 6, 2016

(54) HYDRAULIC TRANSMISSION CIRCUIT WITH MULTIPLE CAPACITIES

(71) Applicant: POCLAIN HYDRAULICS INDUSTRIE, Verberie (FR)

(72) Inventors: Clement Recoura, Mery la Bataille (FR); Guillaume Charrier, La Croix en Touraine (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 760 days.

(21) Appl. No.: 13/742,511

(22) Filed: Jan. 16, 2013

(65) Prior Publication Data

US 2013/0180237 A1    Jul. 18, 2013

(30) Foreign Application Priority Data

Jan. 18, 2012    (FR) ..................... 12 50481

(51) Int. Cl.
*F15B 7/00*    (2006.01)
*F04B 1/047*    (2006.01)
(Continued)

(52) U.S. Cl.
CPC ............... *F15B 7/008* (2013.01); *F03C 1/045* (2013.01); *F03C 1/047* (2013.01); *F03C 1/247* (2013.01);
(Continued)

(58) Field of Classification Search
CPC ........ F15B 11/16; F16H 61/448; F16H 61/452
(Continued)

(56) References Cited

U.S. PATENT DOCUMENTS 3,421,389 A * 1/1969 Fauchere ................. 74/665 P
4,958,696 A * 9/1990 Lerchbaum ............... 180/6.7
(Continued)

FOREIGN PATENT DOCUMENTS

DE    3027983 A1 * 2/1982 ............ F16H 61/44
DE    19833942 A1    2/2000
(Continued)

OTHER PUBLICATIONS

European Search Report dated Nov. 28, 2012; FA 761146 FR1250481.
English Translation of Japanese Office Action dated Aug. 30, 2016; Appln. No. 2013-006235.

*Primary Examiner* — John K Fristoe, Jr.
*Assistant Examiner* — Matthew Wiblin
(74) *Attorney, Agent, or Firm* — Ladas & Parry LLP (57) ABSTRACT

A hydraulic transmission circuit comprising three or four coupled hydraulic elementary motors, each elementary motor having a first and a second secondary enclosure. The circuit includes four distribution valves for which the respective outlet channels may be selectively connected to two main conduits for supplying fluid to and discharging fluid from the circuit. The outlet channels of the first and second valves are connected to at least one of the first secondary enclosures; those of the third and fourth valves are connected to at least one of the second secondary enclosures. Each of the elementary motors has a first secondary enclosure connected to a single valve from among the first or second valve and a second secondary enclosure connected to a single valve from among the third or fourth valve. The valve pairs thereby connected to said elementary motors respectively, are all distinct, two by two.

16 Claims, 3 Drawing Sheets

(51) Int. Cl.
*F04B 1/107* (2006.01)
*F04B 49/00* (2006.01)
*F03C 1/40* (2006.01)
*F03C 1/047* (2006.01)
*F03C 1/247* (2006.01)
*F16H 61/452* (2010.01)
*F16H 61/4096* (2010.01)
*F16H 61/448* (2010.01)
*B60K 17/10* (2006.01)

(52) U.S. Cl.
CPC ............. *F04B 1/047* (2013.01); *F04B 1/1071* (2013.01); *F04B 49/002* (2013.01); *F15B 7/003* (2013.01); *F15B 7/006* (2013.01); *F16H 61/4096* (2013.01); *F16H 61/448* (2013.01); *F16H 61/452* (2013.01); *B60K 17/10* (2013.01); *F15B 2211/20538* (2013.01); *F15B 2211/212* (2013.01); *F15B 2211/7058* (2013.01); *F15B 2211/7107* (2013.01); *F15B 2211/7121* (2013.01); *F15B 2211/7128* (2013.01)

(58) Field of Classification Search
USPC ............................... 60/425, 484; 91/519, 530
See application file for complete search history.

(56) References Cited

U.S. PATENT DOCUMENTS

2007/0119298 A1* 5/2007 Steinborn et al. ............... 91/454
2009/0229907 A1* 9/2009 Tsukamoto et al. ........... 180/307
2012/0036994 A1* 2/2012 Souply et al. ................... 91/519

FOREIGN PATENT DOCUMENTS

| | | | |
|---|---|---|---|
| DE | 102008000095 A1 | 7/2008 | |
| FR | 2719001 A1 | 10/1995 | |
| FR | 2828544 A1 | 2/2003 | |
| FR | 2940671 A1 * | 7/2010 | ......... F16H 61/448 |
| JP | 48-51018 A | 7/1973 | |
| JP | 54-99966 A | 12/1979 | |
| JP | 56-97649 A | 8/1981 | |
| WO | 2010/076542 A2 | 7/2010 | |
| WO | WO 2010118816 A1 * | 10/2010 | ......... F16H 61/4061 |

* cited by examiner

HYDRAULIC TRANSMISSION CIRCUIT WITH MULTIPLE CAPACITIES

This application claims the priority benefit of French Patent Application No. 1250481, filed on Jan. 18, 2012, the disclosure of which is incorporated herein by reference.

The invention relates to a hydraulic transmission circuit comprising:

two main conduits, for supplying fluid and discharging fluid, respectively;

three or four hydraulic elementary motors associated for a same drive;

each of these elementary motors having a first secondary enclosure for a fluid supply and a second secondary enclosure for fluid discharge; these motors delivering output torques in the same direction when they are fed via their first respective secondary enclosures;

a first, a second, a third and a fourth distribution valve; each of these distribution valves having an outlet channel and two inlet channels, and being capable of selectively connecting the outlet channel selectively with either one of said inlet channels;

said two inlet channels of said distribution valves being respectively connected to said two main conduits.

In this circuit, additionally, the outlet channels of the first and second valve are connected to at least one first secondary enclosure of the elementary motors.

By 'hydraulic elementary motors' here, is meant either a hydraulic motor, or a sub-motor of a hydraulic motor, this sub-motor being part of the hydraulic motor, capable, when it is supplied alone, of providing a driving torque (non-zero) to the output member of the motor, and this regardless of the angular position of this output member relatively to the fixed structure of the motor. Preferably, the torque delivered by the sub-motor is substantially independent of the angular position of the output member of the motor relatively to the fixed structure of the motor. It follows that a sub-motor, when it is supplied alone, is capable of providing work similar to that provided by the complete motor, but with speed of rotation and torque being different from those of the complete motor, the capability of the sub-motor being different from that of the complete motor. The invention in particular is directed to a circuit comprising hydraulic elementary motors of the type with radial pistons. These elementary motors notably include pistons sliding in cylinders, the cylinders being positioned radially around the axis of rotation of the motor.

For example, the hydraulic transmission circuits targeted by the invention may be used for driving into translation a machine or driving a tool borne by a machine. The elementary motors may then be distinct motors, for example for driving distinct wheels of the machine.

In the sense of the invention, two elementary motors associated for a same drive are two elementary motors connected through a mechanical means, for example a shaft, a belt, a gear, or further acting on a same element in order to cause a same effect on or relatively to the latter. For example, both elementary motors drive two distinct wheels of a vehicle, and thus act both together on a same ground in order to cause the vehicle to advance, the circuit of which is part thereof.

BACKGROUND

A circuit as the one defined in the introduction is disclosed by International Application PCT/FR2009/052719 in the name of the Applicant.

However, the circuit presented by this International Application can only be operated with a limited number of distinct capacities, i.e. in this case, six positive capacities and six negative capacities (by 'positive' or 'negative' capacity, are meant here, with reference to a predetermined direction of circulation of the fluid, capacities for which the fluid circulates in the predetermined direction or in the direction opposite to the latter, respectively).

Now, as indicated by said International Application, there exists a need for hydraulic circuits having a large number of different capacities, and thereby having great operative flexibility allowing variation of the speeds and of the driving torque in order to adapt the operation of the machine according to circumstances.

BRIEF SUMMARY OF THE INVENTION

According to an aspect of the present invention, there is provided a hydraulic transmission circuit comprising: two main conduits for supplying and discharging fluid; three or four hydraulic elementary motors associated for a same drive, each of said elementary motors having a first secondary enclosure for supplying fluid and a second secondary enclosure for discharging fluid, said motors delivering output torques in the same direction when they are fed via their first respective secondary enclosures; a first, a second, a third and a fourth distribution valve, wherein: each of said distribution valves has an outlet channel and two inlet channels, and is capable of selectively connecting the outlet channel with selectively either one of said inlet channels; said two inlet channels of said distribution valves are connected to said two main conduits respectively; the outlet channels of said first and second valves are connected to at least one of said first secondary enclosures of the elementary motors; the outlet channels of said third and fourth valves are connected to at least one of said second secondary enclosures of the elementary motors; each of the elementary motors is exclusively connected to a pair of valves, formed by the valve from among the first and second distribution valve to which the first secondary enclosure of the relevant motor is connected, and the valve from among the third or fourth distribution valve to which the second secondary enclosure of the relevant motor is connected; and the pairs of valves associated with the different elementary motors are all distinct two by two.

A first object of the invention is therefore to propose a hydraulic transmission circuit of the type presented in the preamble, and benefiting from high flexibility in use by the possibility of operating with multiple capacities.

This object is achieved by the fact that in the circuit:

the outlet channels of said third and fourth valves are connected to at least one of said second secondary enclosures of the elementary motors;

each of the elementary motors is exclusively connected to a pair of valves, formed by the valve from among the first and second distribution valve to which the first secondary enclosure of the relevant motor is connected, and the valve from among the third or fourth distribution valve to which the second secondary enclosure of the relevant motor is connected; and the pairs of valves associated with the different elementary motors are all distinct two by two.

Thus, in this circuit, it is not possible to identify two distinct elementary motors, for which the first secondary enclosures are both connected to a same distribution valve (therefore forming a common supply valve), and for which together the second secondary enclosures are both connected to a same distribution valve (therefore forming a common discharge valve).

By the layout of the circuit according to the invention, the latter has a large number of capacities, because the different elementary motors may be operated by the four valves in different operating modes having seven distinct positive capacities and seven distinct negative capacities.

In a first embodiment, the circuit comprises three elementary motors. The outlet channels of the first, second, third and fourth distribution valves are then respectively connected:

- to the first secondary enclosures of the first and second elementary motors;
- to the first secondary enclosure of the third elementary motor;
- to the second secondary enclosure of the first elementary motor;
- to the second secondary enclosures of the second and third elementary motors.

In this embodiment, the hydraulic circuit may be operated according to the following activation table:

| Grooves | | | | Motors | | | |
|---|---|---|---|---|---|---|---|
| G1 | G2 | G3 | G4 | M1 | M2 | M3 | Capacity |
| 0 | 0 | 0 | 0 | 0 | 0 | 0 | 0 |
| 0 | 0 | 0 | 1 | 0 | −1 | −1 | −Cyl2 − Cyl3 |
| 0 | 0 | 1 | 0 | −1 | 0 | 0 | −Cyl1 |
| 0 | 0 | 1 | 1 | −1 | −1 | −1 | −Cyl1 − Cyl2 −Cyl3 |
| 0 | 1 | 0 | 0 | 0 | 0 | 1 | Cyl3 |
| 0 | 1 | 0 | 1 | 0 | −1 | 0 | −Cyl2 |
| 0 | 1 | 1 | 0 | −1 | 0 | 1 | −Cyl1 + Cyl3 |
| 0 | 1 | 1 | 1 | −1 | −1 | 0 | −Cyl1 − Cyl2 |
| 1 | 0 | 0 | 0 | 1 | 1 | 0 | Cyl1 + Cyl2 |
| 1 | 0 | 0 | 1 | 1 | 0 | −1 | Cyl1 − Cyl3 |
| 1 | 0 | 1 | 0 | 0 | 1 | 0 | Cyl2 |
| 1 | 0 | 1 | 1 | 0 | 0 | −1 | −Cyl3 |
| 1 | 1 | 0 | 0 | 1 | 1 | 1 | Cyl1 + Cyl2 + Cyl3 |
| 1 | 1 | 0 | 1 | 1 | 0 | 0 | Cyl1 |
| 1 | 1 | 1 | 0 | 0 | 1 | 1 | Cyl2 + Cyl3 |
| 1 | 1 | 1 | 1 | 0 | 0 | 0 | 0 |

In this table, the grooves of the motor are numbered from G1 to G4. The elementary motors M1, M2 and M3 further have respective capacities either equal or different, Cyl1, Cyl2 and Cyl3.

It is therefore seen that the thereby formed circuit has seven positive capacities and seven negative capacities (under the additional assumption that the three elementary motors M1, M2 and M3 are of different capacities and that the sum of the two smallest capacities is not equal to the largest capacity).

By considering that the respective capacities Cyl1, Cyl2 and Cyl3 are decreasing, the seven positive capacities are respectively Cyl1, Cyl2, Cyl3, Cyl1+Cyl2, Cyl1−Cyl3, Cyl2+Cyl3, Cyl1+Cyl2+Cyl3.

Therefore there is a capacity subtraction configuration Cyl1−Cyl3. In this capacity, the fluid partly circulates as a loop in the motor without passing through the remainder of the hydraulic circuit.

The circuit according to the invention may also comprise four elementary motors rather than three. The first three elementary motors are then connected to the distribution valve in the same way as in the previous circuit comprising three elementary motors. Further, the fourth elementary motor is connected in the following way:

- the first secondary enclosure of the fourth elementary motor is connected to the outlet of the second valve; and
- the second secondary enclosure of the fourth elementary motor is connected to the outlet of the third valve.

The thereby formed circuit also has seven positive capacities and seven negative capacities (under the additional assumption that the four elementary motors M1 M2 M3 and M4 have different capacity and that the sum of both capacities is not equal to the sum of the additional capacities).

The possibilities of putting the secondary enclosures of the different elementary motors in communication with either one of the main conduits, provided by the distribution valves, allow utilization of the elementary motors in one of the four following operating modes:

high pressure inactive mode, both enclosures being brought to the pressure of the main circuit of higher pressure (to simplify, this will be referred to as 'high pressure of the pump');

low pressure inactive mode, both enclosures being brought to the pressure of the main circuit of lower pressure (to simplify this will be referred to as 'low pressure of the pump');

driving mode, both enclosures being at the high and the low pressure of the pump, respectively, and the delivered torque being a driving torque in a desired driving direction for the machine to which the circuit belongs;

antagonistic mode, both enclosures being at the high and the low pressure of the pump, respectively, and the delivered torque being a torque applied in the direction opposite to the desired driving direction for the machine to which the circuit belongs.

Finally, it is specified that each of the elementary motors includes a fixed structure and an output member, and is capable when it is fed alone, of providing a non-zero driving torque to this output member, regardless of the angular position of the latter relatively to the fixed structure of the elementary motor. It follows that an elementary motor cannot be laid out around a single cylinder containing a piston, and rotatably mounted relatively to a cam on which the piston would act radially. An assembly laid out in this way cannot actually deliver a non-zero driving torque regardless of its angular position.

Preferably, the elementary motors of the circuit according to the invention are constant-velocity motors (A constant-velocity motor is a motor wherein, when the fluid feed flow rate is constant, the speed of rotation of the rotary portion of the motor (cylinder block or cam) is substantially constant).

Advantageously, these elementary motors may be part of a same hydraulic motor, and be integrated into the case of the latter.

The aperture ratio in a motor—or by extension, in a hydraulic circuit including hydraulic motors associated for a same drive—designates the ratio between a capacity and the largest capacity of the motor (or of the circuit). The larger this ratio, the more it is necessary to introduce stages with intermediate capacities. The larger the number of discrete stages, the closer one gets to a continuously variable capacity.

Advantageously, the circuit according to the invention has a high aperture ratio. The minimum aperture ratio is actually three for a motor with three elementary motors (obtained with identical capacities).

The respective capacities of the elementary motors may be selected so as to optimize the staging of the global different capacities of the circuit.

Generally, the circuit is designed so that it has a high maximum aperture ratio and well distributed or staged global capacities. Other dimensioning criteria may be taken into account, such as for example a maximum size difference between the different elementary motors.

In an embodiment, the non-zero capacities form a substantially geometrical series, in particular when the circuit includes a swash plate pump, which ensures the supply of the elementary motors. Indeed, upon passing from a capacity to a lower capacity, the capacity of the pump has to be quasi-instantaneously adjusted to the capacity reduction of these motors. If the distribution of the capacities is geometrical, advantageously in the case of a decrease in capacity, the swash plate has always to reduce its capacity by a same ratio.

For example, in an embodiment, the three elementary motors have non-zero capacities Cyl1, Cyl2, and Cyl3 such that:

$$(12/13) \times Cyl1 = Cyl2 = (11/12) \times Cyl3$$

Advantageously, these ratios between the capacities of the elementary motors allow a motor to be made with a maximum aperture of six and a staging of the capacities forming a substantially geometrical series. The aperture ratio is actually six since the smallest capacity (Cyl1−Cyl3) is one sixth of the full capacity. Further, the distribution of the capacities is close to a geometrical series.

In an embodiment, the circuit further includes a fluid accumulator capable of storing mechanical energy transmitted by the elementary motors, and of giving back this energy to the elementary motors. In such a circuit, the non-zero capacities preferably form a substantially arithmetic series. Indeed, by this feature, the regular staging of the different capacities advantageously gives the possibility of finely regulating the torque applied to the wheel (or to the member driven by the elementary motors), independently of the pressure in the fluid accumulator.

By a substantially geometrical or substantially arithmetic series, respectively, is meant a series in which the ratios between two consecutive terms or the differences between two consecutive terms respectively do not differ by more than 20% (i.e. for a geometrical series, the largest ratio does not exceed 1.2× the smallest ratio; and for an arithmetic series, the largest difference does not exceed 1.2× the smallest difference).

DESCRIPTION OF DRAWINGS

The invention will be better understood and its advantages will become better apparent upon reading the detailed description which follows, of embodiments illustrated as non-limiting examples. The description refers to the appended drawings, wherein.

It will be noted that, unless mentioned otherwise, the circuits shown may include additional elements not shown and notably customary and well-known elements in hydraulic circuits, such as boost pumps, anti-overpressure devices, etc., Referring to FIG. 1, a hydraulic transmission circuit according to the invention will now be described.

This circuit 10 includes three elementary motors M12, M14, M16. These three elementary motors deliver their respective torques on a same output shaft 18. Each elementary motor includes a first secondary enclosure (enclosures 12A, 14A, 16A) for supplying fluid and a second secondary enclosure for discharging fluid (enclosures 12B, 14B, 16B). As this will be explained later on, some of these enclosures may be common to several elementary motors.

The circuit 10 further includes a hydraulic pump 20, and two main conduits 26 and 28 connected to two main orifices of the latter, provided for supplying fluids to and discharging fluids from the different elementary motors of the circuit 10.

The circuit 10 also includes a fluid distributor 30 for distributing the fluid from the main conduits 26 and 28 to the elementary motors M12, M14, and M16.

The fluid distributor 30 includes four distribution valves 32, 34, 36 and 38. These four valves are valves with hydraulic control, identical with each other. They are collectively designated as '3x' valves.

Each of these valves includes an outlet channel A and two inlet channels B, C. The outlet channel A is connected to the inlet channel B when the valve is placed in a first position I, and to the inlet channel C when the valve is placed in a second position II.

The channels B of the valves 3x are connected to the first main conduit 26; the channels C are connected to the second main conduit 28.

The channels C of the valves 3x are respectively connected:

to the first secondary enclosures 12A, 14A of the first and second elementary motors M12, M14;
to the first secondary enclosure 16A of the third elementary motor M16;
to the second secondary enclosure 12B of the first elementary motor M12;
to the second secondary enclosures 14B, 16B of the second and third elementary motors M14, M16.

Thus, the first motor 12 is connected to the distribution valves 32 and 36 forming a first pair of valves associated with the motor 12; the motor 14 in the same way is associated with the valves 32 and 38; the motor 16 is associated with the valves 34 and 38. It is seen that the three pairs of valves mentioned earlier are all distinct two by two.

Each of the valves 3x includes a moveable spool, having two stable positions. The position of the spool is controlled by the pressure of the controlled chamber of the valve. The pressures in the control chambers of the valves 3x are driven by a control system not shown of the hydraulic transmission circuit 10. This control system may include an electronic control unit, which imposes pressures in the different control chambers of the valves 3x via solenoid valves.

Depending on the position in which are placed the valves 3x, it is seen that the circuit 10 may be operated according to seven positive capacities and seven negative capacities, as indicated previously.

Figure 2:
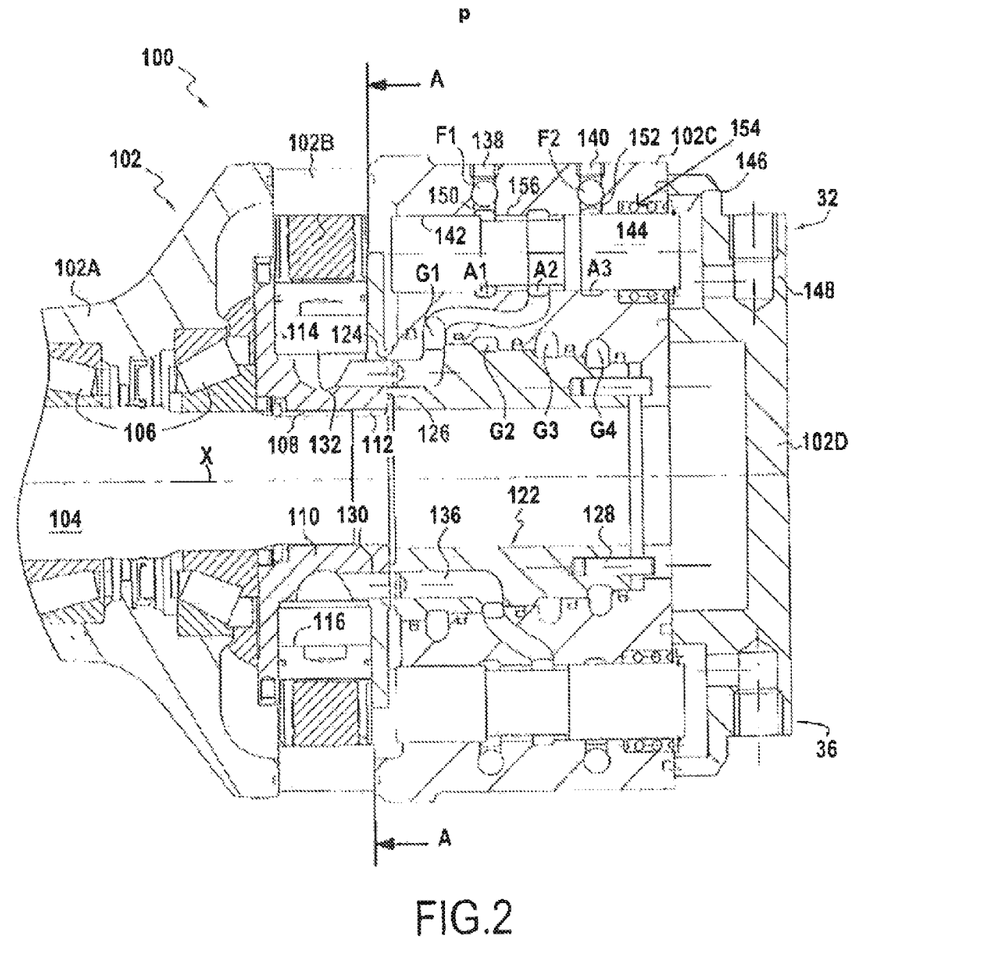
FIG. 2 is a longitudinal section of a motor comprising three sub-motors, forming a circuit according to the invention.
Figure 3:
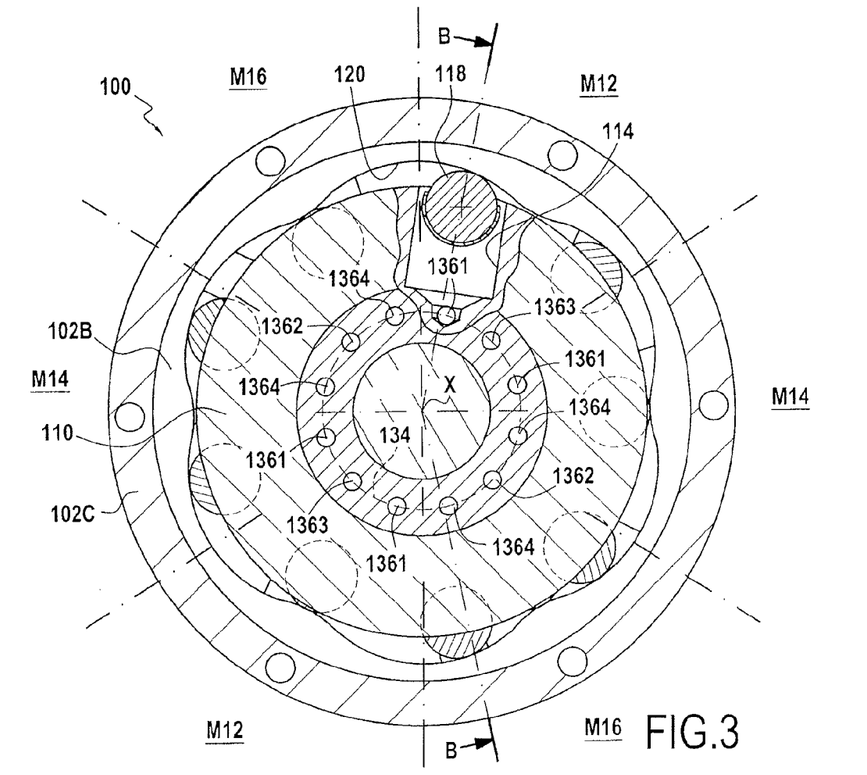
FIG. 3 is an axial section, at the cylinder block, of the motor illustrated in FIG. 2, along the section A-A.

Referring to FIGS. 2 and 3, an embodiment of the circuit 10 will be presented. In this embodiment, the circuit 10 essentially comprises a motor 100, which contains both the distributor 30 and the valves 3x, and the elementary motors M12, M14 and M16. The pump 20 may be any hydraulic pump of a known type and is not illustrated.

The hydraulic motor 100 comprises:
- a case 102 formed by four portions 102A, 102B, 102C and 102D assembled by screws not shown;
- an output shaft 104, rotatably mounted about a geometrical axis X, relatively to the case 102, by means of conical rolling bearings 106 and provided with splines 108 positioned on its end contained inside the case 102;
- a cylinder block 110, provided with inner splines 112, which cooperate with the splines 108 of the output shaft 104 in order to make both of these parts interdependent in rotation, this cylinder block 110 being contained inside the case 102 and including nine cylinders 114 positioned radially, regularly spaced apart angularly;
- pistons 116, slideably mounted in the cylinders 114, one per cylinder, each provided at its end exterior to the corresponding cylinder, with a rotary roller 118 which may be bearing upon the corrugated internal surface of the portion 102B of the case, conformed as a cam 120 with six lobes;
- the fluid distributor 30 mentioned earlier, notably comprising a port plate 122 including a planar face 124 perpendicular to the axis X and bearing upon a planar face 126, also perpendicular to the axis X, with which the cylinder block 110 is provided; the port plate 122 being made rotation-interdependent of the portion 102C of the case, and therefore of the cam 120, by means of pins 128, and further including on its radially external face, four grooves G1, G2, G3 and G4, coaxial with the axis X;
- cylinder conduits 130, one per cylinder, connecting the chambers 132 delimited by the cylinders 114 and the corresponding pistons 116, to the planar face 126 of the cylinder block 110, into which they open through regularly spaced out cylinder orifices, while being centered on a circle 134 coaxial with the axis X;
- distribution conduits 136 laid out in the port plate 122, and opening into the planar face 124 of the latter two orifices also centered on the circle 134, the distribution conduits 136 being twelve in number, i.e. one conduit per lobe ramp of the cam, either ascending or descending; the distribution conduits 136 being each connected to one of the grooves G1 to G4, so that each cylinder conduit 130 during the rotation of the motor is lead to successively communicate with the distribution conduits 136, themselves being connected to the different grooves G1, G2, G3, G4 of the motor;
- two grooves F1 and F2, coaxial with the axis X of the motor, laid out in the case 102C; the groove F1 communicating through a connector 138 with the first main conduit 26, and the groove F2 communicating through a connector 140 with the second main conduit 28.

The distributor 30 further includes the four distribution valves 3x mentioned earlier. These valves 3x are integrated into the case portion 102C around the port plate 122.

These valves 3x are identical with each other; for this reason, only the valve 32 will be described (FIG. 3).

The valve 32 includes:
- a bore 142, laid out in the portion 102C of the case and opening on either side of the latter along the axis X;
- a sliding spool 144 for selecting the capacity, mounted in the bore 142;
- a control chamber 146 for the spool 144, laid out in a bore laid out in the face of the case 102D located on the side of the case 102C facing the bore 142, the chamber 146 receiving an end of the spool 144 and being further connected to an external conduit not shown through a control conduit 148;
- three grooves A1, A2 and A3, laid out in the portion 102C of the case, coaxial with the bore 142. The grooves A1 and A3 are respectively connected to the grooves F1 and F2 (and by this means, to the main conduit 26 and 28) through connecting conduits 150 and 152;
- a helical spring 154, wound around the spool 144 in an enlarged portion of the bore 142; this spring being at one end bearing upon the bottom of said enlarged portion, and at the other end, being blocked at the end of the spool 144 by a circlip; the spring 154 having an antagonistic effect to that of the fluid pressure inside the control chamber 146.

The middle grooves A2 of the valves 3x are moreover connected to the grooves G1, G2, G3, G4 respectively.

The valves 3x therefore operate in the following way: The spool 144 includes a wide groove 156 which according to the position adopted by the spool, causes the middle groove A2 to communicate with either one of the end grooves A1 and A3 of the valves 3x. Thus, in a first position (spool 144 on the left, FIG. 3), the groove 156 of the spool 144 links the grooves A1 and A2 and therefore the grooves F1 and G1. In a second position (spool 144 on the right), the groove 156 links the grooves A2 and A3 and therefore the grooves F2 and G1.

It follows that by controlling the position of the valves 3x, via their respective hydraulic control chambers 146, it is possible to selectively link each of the grooves G1 to G4 with either one of the grooves F1 and F2 and therefore with either one of the main conduits 26 and 28.

The layout of the motors M12, M14 and M16 indicated earlier within the motor 100 will now be specified.

The six lobes of the cam 120 form three groups of two opposite lobes, which respectively delimit the motors M12, M14 and M16 (FIG. 2). The fluid supply and discharge for the different motors M12, M14 and M16 are accomplished via the twelve distribution conduits 136 laid out in the port plate 122. Each elementary motor comprises four distribution conduits 136. The distribution of these circuits per groove appears in FIG. 4, wherein each of the distribution conduits bears the reference '136' followed by the number of the groove to which it is connected. It is seen that the grooves 2 and 3 are each bound only to two conduits 1362 and 1363, while the grooves 1 and 4 are each bound to four conduits 1361 and 1364.

Figure 1:
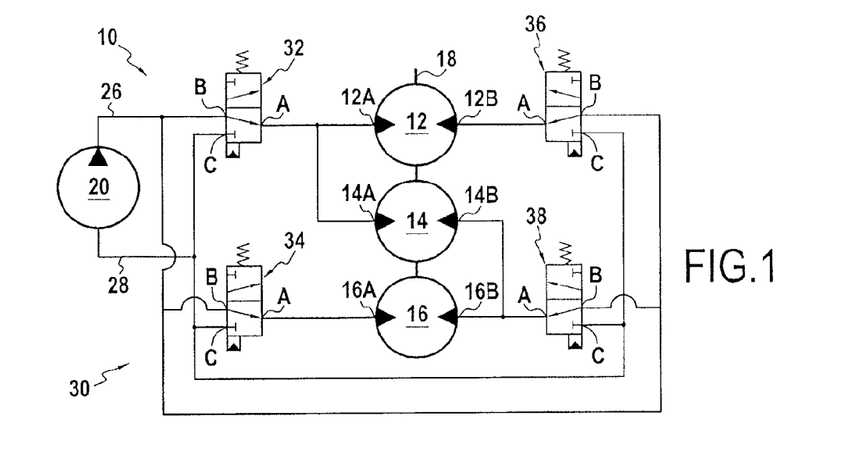
FIG. 1 is a schematic view of a hydraulic transmission circuit in the embodiment of the invention only including three elementary motors.

This layout of the distribution conduits 136 corresponds to the block diagram of FIG. 1. It may be noted that the secondary enclosures of the elementary motors are not distinct from each other, but correspond to the grooves G1 to G4: The groove G1 corresponds to the enclosures 12A and 14A, the groove G2 to the enclosure 16A, the groove G3 to the enclosure 12B, the groove G4 to the enclosures 14B and 16B.

The motor 100 illustrated by FIGS. 2 and 3 may be operated in the seven positive capacities and seven negative capacities shown earlier. The capacity used depends on the position adopted by the different spools (144) of the four valves 3x. This position as for it depends on the control pressures applied in the control conduits (148) of the different control chambers (146).

Figure 4:
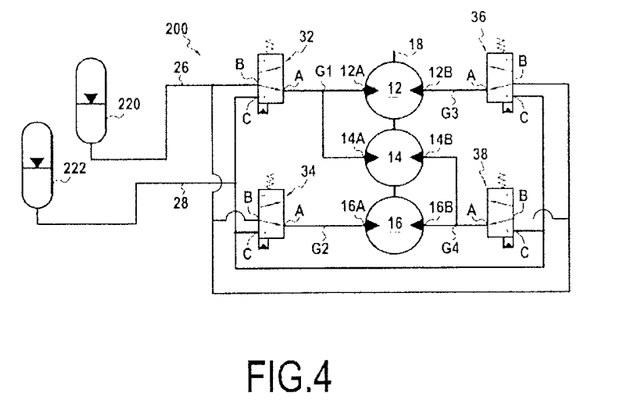
FIG. 4 is a schematic view of a hydraulic transmission circuit according to the invention, forming an energy recovery circuit.

FIG. 4 illustrates a circuit 200 which is an alternative of the first embodiment of the invention exhibited by FIGS. 1 to 3. This circuit 200 includes two fluid accumulators 220 and 222 with gas pressure, of the type known per se. These fluid accumulators form a high pressure fluid source (accumulator 220) and a fluid storage or receptacle under low pressure (accumulator 222), respectively.

Except for the fluid storage/supply components, the other components of the circuit 200 are identical with the corresponding components of the circuit 10 and therefore bear the same references.

The accumulator 220 is connected to the first main conduit 26 and allows injection into the latter of the pressurized fluid. The fluid being discharged from the elementary motors is returned via the conduit 28 to the low pressure accumulator 222.

The circuit 200 therefore forms an energy recovery system, capable of storing mechanical energy provided by the shaft 18, and then of giving it back to this same shaft. The large number of different capacities of the circuit 200 gives this circuit, great operating flexibility for its use as an energy recovery system.

Figure 5:
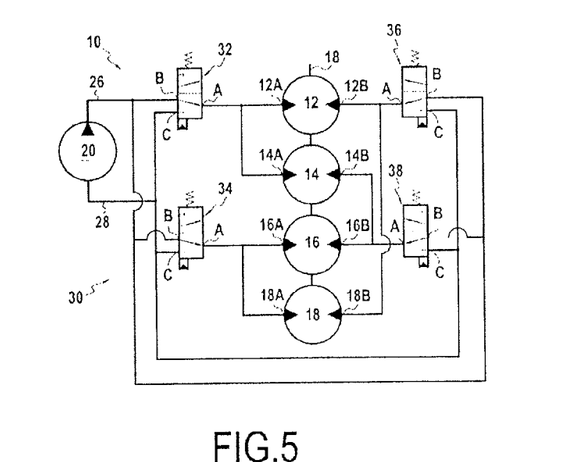
FIG. 5 is a schematic view of a hydraulic transmission circuit in a second embodiment of the invention, including four elementary motors.

FIG. 5 illustrates a transmission circuit 300 which illustrates the second embodiment of the invention. Indeed, the circuit 300 in addition to the three elementary motors 12, 14 and 16, includes a fourth elementary motor 18. This elementary motor 18 has a first secondary enclosure 18A connected to the outlet channel A of the second valve 34, and a second secondary enclosure 18B connected to the outlet channel A of the fourth valve 38.

The presence of the fourth elementary motor 18 gives the possibility of obtaining capacities different from those of a circuit with three elementary motors. This gives the possibility that the circuit 300 have other capacity ratios relatively to the latter circuit. This further gives the possibility that its capacities should form or at the very least be closer to geometrical or arithmetic series different from those of the circuit including three elementary motors.

Finally, from a technical point of view, the circuit 300 may be made as a motor similar to that of FIGS. 2 and 3, but including eight cam lobes and twelve pistons.

The invention claimed is:

1. A hydraulic transmission circuit comprising: two main conduits, respectively for supplying fluid and for discharging fluid; exactly three hydraulic elementary motors associated for a same drive; each of said elementary motors having a first secondary enclosure for supplying fluid and a second secondary enclosure for discharging fluid; said motors delivering output torques in the same direction when they are fed via their first respective secondary enclosures; a first, a second, a third and a fourth distribution valve; wherein: each of said distribution valves has an outlet channel and two inlet channels, and is capable of selectively connecting the outlet channel with selectively either one of said inlet channels; said two inlet channels of said distribution valves are connected to said two main conduits respectively; each of the elementary motors is exclusively connected to a pair of valves formed by the valve from among the first and second distribution valve to which the first secondary enclosure of the relevant motor is connected, and the valve from among the third or fourth distribution valve to which the second secondary enclosure of the relevant motor is connected; each of the pairs of valves associated with each of the elementary motors is a unique combination of the first, the second, the third, and the fourth distribution valves; and said outlet channels of said first, second, third and fourth distribution valves are respectively connected:
to the first secondary enclosures of the first and second elementary motors;
to the first secondary enclosure of the third elementary motor;
to the second secondary enclosure of the first elementary motor;
to the second secondary enclosures of the second and third elementary motors.

2. The circuit according to claim 1, wherein said elementary motors are constant-velocity motors.

3. The circuit according to claim 1, wherein said elementary motors are of different capacities.

4. The circuit according to claim 1, wherein each elementary motor has a non-zero capacity, and the respective non-zero capacities of the elementary motors form a substantially geometrical series.

5. The circuit according to claim 1, further including a fluid accumulator capable of storing mechanical energy transmitted by said elementary motors, and of giving back said energy to said elementary motors.

6. The circuit according to claim 1, wherein each elementary motor has a non-zero capacity, and the non-zero capacities form a substantially arithmetic series.

7. The circuit according to claim 1, wherein said elementary motors are part of a same hydraulic motor, and are integrated into a case of the same hydraulic motor.

8. The circuit according to claim 1, wherein the circuit includes a swash plate pump which ensures the supply of said elementary motors.

9. A hydraulic transmission circuit comprising: two main conduits, respectively for supplying fluid and for discharging fluid; exactly four hydraulic elementary motors associated for a same drive; each of said elementary motors having a first secondary enclosure for supplying fluid and a second secondary enclosure for discharging fluid; said motors delivering output torques in the same direction when they are fed via their first respective secondary enclosures; a first, a second, a third and a fourth distribution valve; wherein: each of said distribution valves has an outlet channel and two inlet channels, and is capable of selectively connecting the outlet channel with selectively either one of said inlet channels; said two inlet channels of said distribution valves are connected to said two main conduits respectively; each of the elementary motors is exclusively connected to a pair of valves formed by the valve from among the first and second distribution valve to which the first secondary enclosure of the relevant motor is connected, and the valve from among the third or fourth distribution valve to which the second secondary enclosure of the relevant motor is connected; each of the pairs of valves associated with each of the elementary motors is a unique combination of the first, the second, the third, and the fourth distribution valves; and said outlet channels of said first, second, third and fourth distribution valves are respectively connected: to the first secondary enclosures of the first and second elementary motors; to the first secondary enclosures of the third and fourth elementary motors; to the second secondary enclosures of the first and fourth elementary motors; to the second secondary enclosures of the second and third elementary motors.

10. The circuit according to claim 9, wherein said elementary motors are constant-velocity motors.

11. The circuit according to claim 9, wherein said elementary motors are of different capacities.

12. The circuit according to claim 9, wherein each elementary motor has a non-zero capacity, and the respective non-zero capacities of the elementary motors form a substantially geometrical series.

13. The circuit according to claim 9, further including a fluid accumulator capable of storing mechanical energy transmitted by said elementary motors, and of giving back said energy to said elementary motors.

14. The circuit according to claim 9, wherein each elementary motor has a non-zero capacity, and the non-zero capacities form a substantially arithmetic series.

15. The circuit according to claim 9, wherein said elementary motors are part of a same hydraulic motor, and are integrated into a case of the same hydraulic motor.

16. The circuit according to claim 9, wherein the circuit includes a swash plate pump which ensures the supply of said elementary motor.

\* \* \* \* \*